Sept. 24, 1968     A. H. TORONGO, JR     3,402,860
COMBINATION CLOSURE AND LIQUID METERING
DISPENSER FOR SQUEEZE BOTTLES
Filed Dec. 20, 1966     2 Sheets-Sheet 1

INVENTOR.
ALBERT H. TORONGO, Jr.
BY
Morgan, Finnegan, Durham & Pine
ATTORNEYS.

INVENTOR.
ALBERT H. TORONGO, Jr.
BY
Morgan, Finnegan, Durham & Pine
ATTORNEYS.

United States Patent Office 3,402,860
Patented Sept. 24, 1968

3,402,860
COMBINATION CLOSURE AND LIQUID METERING DISPENSER FOR SQUEEZE BOTTLES
Albert H. Torongo, Jr., Yardley, Pa., assignor to McKesson & Robbins Incorporated, New York, N.Y., a corporation of Maryland
Filed Dec. 20, 1966, Ser. No. 603,359
9 Claims. (Cl. 222—207)

ABSTRACT OF THE DISCLOSURE

A liquid metering device for squeeze bottles which mounts within the neck of the bottle to seal the bottle interior and employs an upstanding tube within an opened top metering chamber in conjunction with a bottle cover cap for trapping air within the chamber when the bottle is inverted and the chamber loaded with the metered volume of liquid by squeezing, the bore of the tube which serves as the liquid conduit between bottle interior and chamber being small enough to prevent passage of air into the bottle while liquid is present in the tube, as when the bottle is inverted without being squeezed.

---

This invention relates to closures for squeeze type containers, such as plastic bottles, and particularly to an improved closure which dispenses liquid from such containers in pre-determined metered volumes.

Within recent years, there has been substantial recognition of the advantages in packaging products in squeeze type containers such as plastic bottles, and products so packaged have received widespread acceptance. Such containers are inexpensively mass-produced, light and durable, and are easy to handle and use with one hand.

Similarly, containers that dispense liquids in predetermined measured quantities have been used in increasing numbers. Such containers generally employ valves of a relatively complicated mechanical nature with many moving parts to achieve the metering effect.

However, the advantage of using metering devices in combination with inexpensive squeeze type containers to dispense measured quantities of liquids, particularly drug products, has not been fully realized. This is probably because the generally available meter valves employ many moving mechanical parts. Such meter valves are repeatedly accurate and also simple to operate with one hand but they are relatively expensive to manufacture and assemble. Simple metering devices without moving mechanical parts, on the other hand, are inexpensive but they are not repeatedly accurate or simple to operate with one hand.

Some proposed metering device closures without moving mechanical parts, for example, require the removal of the metering closure from the squeeze bottle when the metered liquid is to be dispensed. This is necessary to prevent the dispensing of unpredictable amounts of liquid from the bottle. However, this procedure is awkward and requires the use of two hands. The act of removing the metering closure may result in the accidental spilling of the metered liquid from the chamber as well as spilling of the liquid from the bottle. Moreover, in some drug applications, such as for use as a douche, it is awkward and difficult to dispense the liquid from the relatively small metering device if the device is unattached to the squeeze bottle.

Other proposed meter devices without moving mechanical parts require shaking of the bottle contents to load the metering chamber of the closure. Such procedure may introduce varying quantities of air or gas bubbles into the metering chamber as the contents of the bottle are used up, with substantial unpredictable deviations resulting in the quantities metered. Still other such proposed devices require the conveyance of the liquid through an additional working part, such as a siphon tube, in order to load the metering chamber of the closure. The amount of liquid remaining in the siphon tube in such devices is related to the height of the liquid level in the bottle. Consequently, when the bottle is inverted for dispensing the metered liquid, substantially varying amounts of liquid will run from the siphon tube into the metering chamber to cause substantial variation in the metered materials.

With such devices, repeatedly accurate metering is not likely. Where relatively close control of the metered amounts is desired, e.g. variations in drug applications should be 20% or less, such devices are inadequate.

The principal object of the present invention is to provide an inexpensively mass-produced metering closure for squeeze-type containers that has no moving mechanical parts and yet can be operated simply to repeatedly dispense accurately metered quantities of liquid.

It is a further object of this invention to provide a metering closure that can be used to dispense liquid with one hand while the closurer remains attached to the squeeze bottle and yet, without the occurrence of any significant overage; i.e., liquid in excess of the pre-selected dosage to be dispensed with each use.

These and other objects, features and advantages are accomplished, according to the invention, by the arrangements and combinations of elements hereinafter fully described and particularly recited in the claims, and will become more apparent therefrom.

Briefly and generally, the various objects, features and advantages of the invention are accomplished by providing a closure body having a metering chamber with an open top therein adapted to fit into and seal with the neck of a conventional squeeze bottle. Suitable means are provided for vertically positioning and fixing the closure body within the neck. The closure body may extend downwardly past the neck and into the interior of the bottle when in position. A removable cover cap is provided for mounting on the neck of the bottle and is adapted to seal off the top of the metering chamber.

Extending upwardly within the metering chamber from the bottom of the closure body is an upstanding tube. The bore of the tube serves as a liquid passageway connecting the interior of the squeeze bottle and the interior or metering chamber of the closure. Liquid from the bottle interior enters the chamber through the passageway when the bottle is inverted and squeezed and compressed air from the chamber vents through the passageway into the bottle interior when the squeezing pressure is released. At least a portion of the tube bore is of a small diameter, this diameter being of a size which is insufficient to permit passage of air towards the bottle interior when the constricted portion is filled with liquid, as when the bottle is inverted without squeezing. However, this constricted portion of the tube passageway is sufficiently large to permit passage of liquid for relatively easy loading of the chamber when the bottle is inverted and squeezed.

Satisfactory diameters vary slightly with the properties of the liquid to be metered. In general, diameters in the range of 0.04 to 0.93 inch provide good results for typical liquid drug products that are suitable for dispensing from squeeze type containers.

Various tube constructions are contemplated. For example, the tube can be constructed with a uniform bore having the aforementioned small diameter. As a further example, the tube bore can be of a double diameter construction.

When it is desired to load the metering chamber of the closure, the cover cap is put in place and the bottle is inverted and squeezed. Liquid from the bottle is forced through the passageway into the chamber compressing the air therein. When the squeezing pressure is released, liquid which has remained in the passageway is drawn back into the bottle with air then being drawn from the chamber through the passageway into the bottle until a pressure balance is obtained between the bottle interior and the chamber of the closure. The squeezing operation is repeated and the displacement of air in the chamber continues until the liquid in the chamber reaches the terminus of the tube trapping the remaining air in the chamber. Because the remaining air is cut off from the tube passageway, displacement can no longer occur and any additional liquid forced to enter the chamber under the pressure caused by the squeezing of the bottle is drawn back into the bottle when the squeezing pressure is released. The bottle is then returned to its normal upright position. The cover cap is then removed and the bottle tipped for dispensing the metered liquid.

Some liquid will pass from the bottle through the tube during this dispensing step of the operation until a sufficient vacuum is built up in the bottle to support the remaining liquid.

However, the total volume of liquid that can escape from any given size squeeze bottle is predictable and is not dependent on the volume of the metering chamber.

Normally, this predictable amount of the liquid product will pass through the tube immediately upon inversion of the bottle for dispensing and can be used as a predetermined part of the desired dosage. After the initial entry of the liquid product, a vacuum condition sufficient to prevent additional liquid from entering the chamber is set up in the bottle.

If the desired dosage is sufficiently large so that the predictable amount of liquid that can pass through the tube during dispensing does not exceed the acceptable tolerance for the product, the metering chamber can be constructed so that the volume of liquid remaining in the chamber after loading and prior to inversion is equal to the desired dosage. The liquid that does escape during the dispensing operation will merely comprise insignificant overage.

In order to reduce the overage actually occurring during dispensing as distinguished from the theoretical predictable amount, means can be provided for retarding the outflow of liquid from the tube. In one form of the invention, such means includes a double diameter tube passageway with the aforementioned small diameter portion being removed from the terminus of the tube. The increase in diameter of the passageway at the terminus has the effect of breaking up the overage stream into droplets with a resultant decrease in actual overage.

As will be understood from the foregoing, the closure body need not be removed from the bottle during dispensing and the bottle thus serves as a convenient handle for a simple one-handed dispensing operation.

Having briefly described the invention, a detailed description of two typical embodiments of the invention will now be made by referring to the accompanying drawings which constitute a part of this specification, of which:

Figure 2:
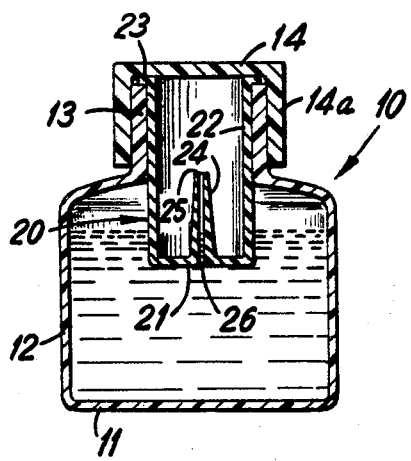
FIGURE 2 is a vertical sectional view illustrating the closure of FIGURE 1 mounted in a squeeze bottle for use.

Turning now in detail to the accompanying drawings wherein like numerals are employed to designate like parts in the several figures, the squeeze bottle 10 is of the conventional type, being made of a flexible and resilient material such as polyethylene or rubber. Bottle 10 is integrally formed with a bottom wall 11, a side wall 12, and a neck 13, illustratively cylindrical in shape, forming an elongated mouth. A metering closure constructed in accordance with the invention is inserted into the neck of the bottle, preferably with a force fit.

The two closure embodiments illustrated in FIGURES 1–5 and FIGURES 6–10 are substantially similar in construction having generally cup-shaped bodies 20, 20a including bottom walls 21, 21a and integrally formed side walls 22, 22a to define metering chambers therein, each being open at the top. Outwardly extending flanges 23, 23a encircle the upper ends of side walls 22, 22a at the open tops. Flanges 23, 23a are adapted to rest, as shown, on the upper edge of neck 13 of the bottle to seal therewith the mouth of the bottle and assure that closure bodies 20, 20a will be properly positioned vertically within the neck.

A cover cap 14, removably secured to neck 13 by means of a depending skirt 14a that can be constructed for a snap or screw fit around the neck, seals against flanges 23, 23a thereby closing off the tops of the metering chambers.

Integrally formed with bottom walls 21, 21a of the closure bodies are upstanding or vertical tubes 24, 24a which extend upwardly within their respective metering chambers. Tubes 24, 24a are illustratively centrally located with respect to bottom walls 21, 21a. Preferably, the volumes of the chambers between the cover cap of the bottle and the termini 25, 25a of the tubes are equal to the volumes of the chambers outside the tubes between bottom walls 21, 21a and termini 25, 25a, i.e., termini 25, 25a are volumetrically centrally located in their respective chambers.

The bore of each of tubes 24 and 24a extending between the interior of the bottle and the interior or metering chamber of their respective closure bodies 20, 20a, functions as a liquid passageway from the chamber to the bottle.

At least a portion of the bore of the tube of each of the closures which embody the present invention has a relatively small diameter. Although the diameter of this constricted portion of the tube bore or passageway is not sharply critical, it is, as described further below, a relatively small diameter. It has been found that a passageway having such a small diameter will prevent the passage of air through the tube when the passageway is filled with liquid. When liquid from the bottle enters the passageway of the tube, as when the bottle is inverted without being squeezed, a negative pressure results in the bottle. Because air cannot, under normal operating conditions, pass through the pasasgeway when liquid is present therein, a vacuum condition is built up which is sufficient to support the remaining liquid in the bottle. Importantly as will appear below, the total liquid which can pass from any given size bottle before this liquid-supporting vacuum condition is reached is a predictable amount and is unrelated to the size of the metering chamber. Despite the use of a small diameter to achieve this effect, it has been found that the passageway opening is sufficiently large to allow liquid to pass easily into the metering chamber when the bottle is inverted and squeezed.

The size of useful and satisfactory diameters is not sharply critical and will vary slightly with the properties of the product to be dispensed. The diameter can be larger when used with products of relatively high surface tension than when used with products of relatively low surface tension. By way of example, useful and satisfactory diameter sizes are generally in the range of 0.04 to 0.093 inch for the dispensing of liquid drug products having a surface tension typical of conventional detergents. The upper limits of the range of generally useful and satisfactory orifice sizes may increase slightly with increased surface tension of the liquid. Similarly, the lower limit may increase slightly with increased viscosity.

In the embodiment illustrated in FIGURES 1–5, the tube bore or passageway 26 has a single diameter, this diameter being of a small size as mentioned above to prevent air from passing therethrough when the pasageway is filled with liquid.

However, the passageway need not be of a single diameter in order to control the passage of liquid when the bottle is inverted without being squeezed. In the embodiment of FIGURES 6–10, only a portion 26a of the tube passageway has such a small diameter. This constricted portion 26a is removed from the terminus of the tube for reasons which fully appear below. The portion of the tube passageway designated by the numeral 27 leading from constriction 26a to the tube terminus 25a is of a larger diameter.

Illustratively, the closure 20a of FIGURES 6–10 has a lateral passageway 28 communicating with the tube passageway below its constricted portion 26a. Lateral passageway 28 has a top wall 29 and two side walls 30 and 31. The two ends of the lateral passageway 28, where the top wall 29 and sidewalls 30 and 31 join with side wall 22a of the closure body and with the wall of the tube 24a, are open. The bottom of the lateral passageway 28 where its side walls 30 and 31 join with bottom wall 21a is also open. The portion of the tube 24a passageway which communicates with lateral passageway 28 may be of the same size diameter as the terminus portion 27 of the tube passageway.

Figure 3:
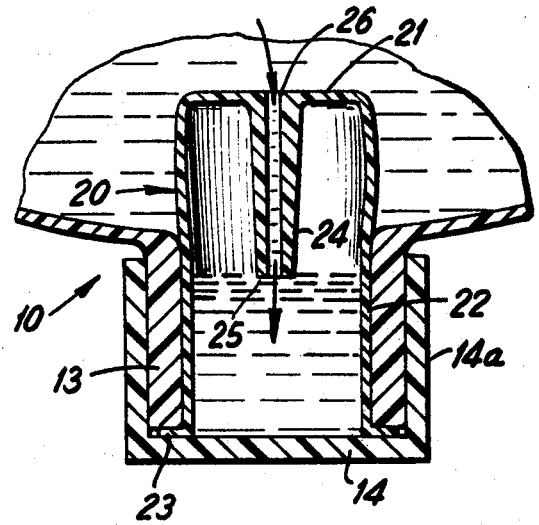
FIGURE 3 is a fragmentary vertical sectional view of the closure and bottle of FIGURE 2 illustrating same inverted during loading of the metering chamber.
Figure 4:
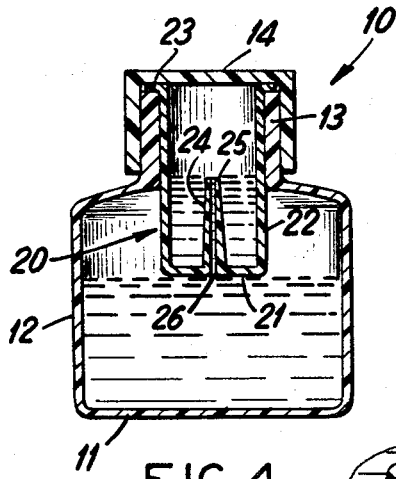
FIGURE 4 is a vertical sectional view of the closure and bottle of FIGURE 2 illustrating same in an upright position after loading of the metering chamber.
Figure 1:
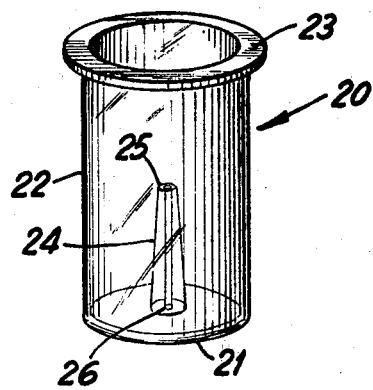
FIGURE 1 is a perspective view of one form of closure embodying the invention.
Figure 5:
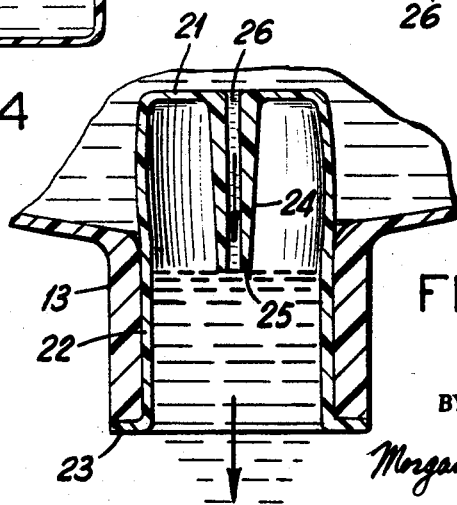
FIGURE 5 is a fragmentary vertical sectional view of the closure and bottle of FIGURE 2 illustrating same inverted during dispensing of the metered liquid.
Figure 7:
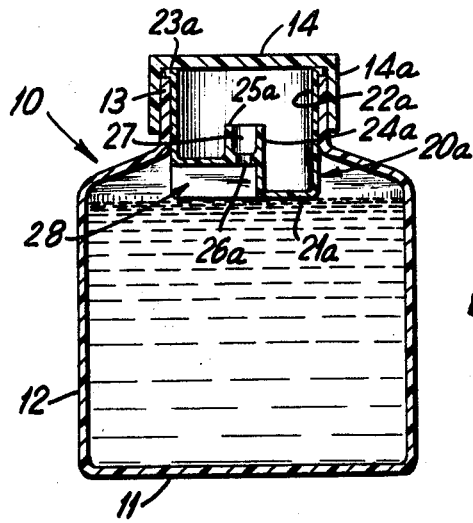
FIGURE 7 is a vertical sectional view of the closure of FIGURE 6 mounted for use in a squeeze bottle.
Figure 8:
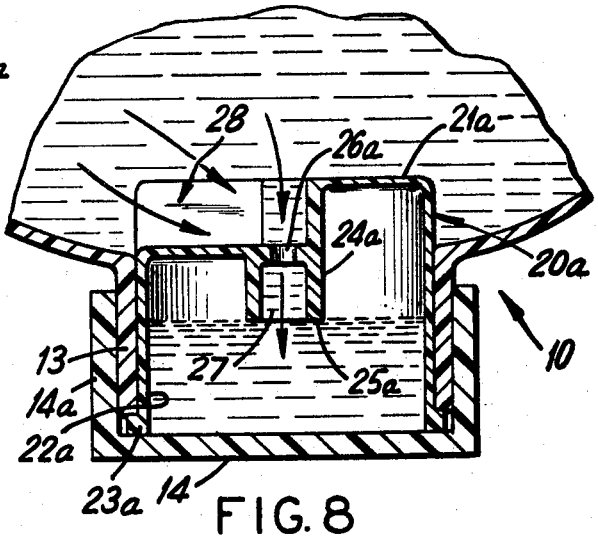
FIGURE 8 is a fragmentary vertical sectional view of the closure and bottle of FIGURE 7 illustrating same inverted during loading of the metering chamber.
Figure 9:
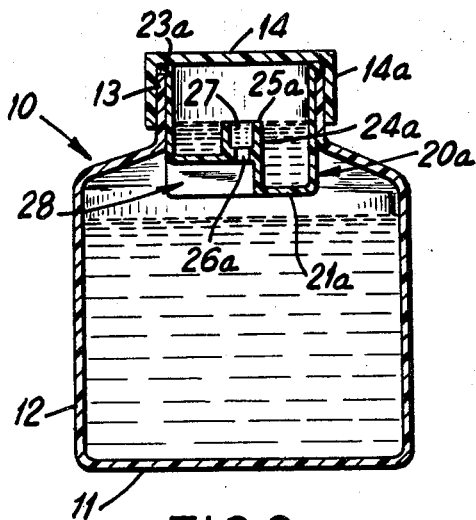
FIGURE 9 is a vertical sectional view of the closure and bottle of FIGURE 7 illustrating same in an upright position after loading of the metering chamber.
Figure 6:
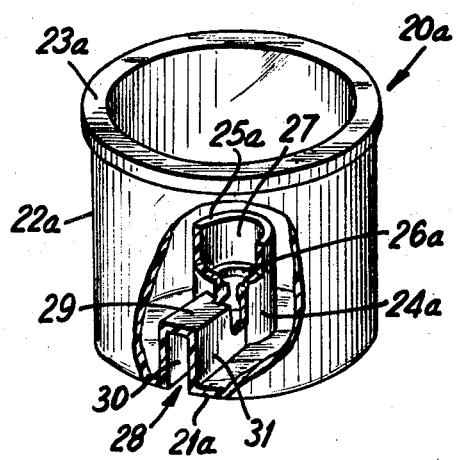
FIGURE 6 is a perspective view of another form of closure embodying the invention with portions broken away to reveal its tube construction.
Figure 10:
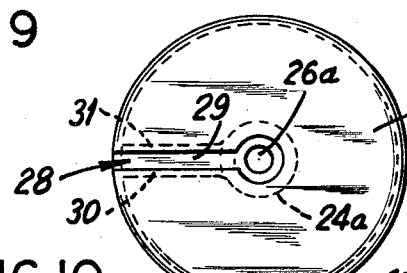
FIGURE 10 is a bottom plan view of the closure of FIGURE 6.

Operation of the invention is relatively simple. FIGURES 2 and 7 show the bottle in its initially upright position with the cover cap snapped in place. The bottle is inverted by the user and then squeezed (FIGURES 3 and 8). The increased pressure within the bottle created by squeezing forces liquid from the interior of the bottle through the tube passageway into the metering chamber of the closure compressing the air therein. When the squeezing pressure is released, the liquid remaining in the tube passageway is drawn back into the bottle and some of the air in the chamber is then vented through the tube into the bottle interior to equalize the pressures in the chamber and bottle. As the squeezing operation is repeated, liquid continues to displace air within the chamber and the level of the liquid within the chamber rises towards the terminus of the tube. When the liquid in the chamber reaches the terminus of the tube, the air remaining in the chamber is trapped and is therefore unable to relieve the partial vacuum remaining in the bottle. No further displacement of air in the chamber can occur. Consequently, any excess liquid which is forced to enter the chamber after this point is reached is drawn back into the bottle when the squeezing pressure is released.

The user then returns the bottle to its upright position (FIGURES 4 and 9) shifting the liquid in the closure to the bottom of the chamber. Since the volume of the chamber above the terminus of the tube is equal to the effective volume of the chamber below the terminus of the tube, the level of the liquid in the chamber is very close to even with the terminus. However, if the liquid level in the chamber should be above the terminus of the tube at this time, gravity causes the excess liquid to return to the bottle resulting in a refined accuracy in the metering. An accurately calibrated amount of the liquid product has been transferred from the bottle to the metering chamber of the closure.

The user next removes the cover cap and tips the bottle to dispense the liquid from the chamber by the usual dumping action.

As mentioned above, a predictable amount of liquid will pass through the tube from the bottle before a vacuum is built up which is sufficient to support the rest of the liquid in the bottle. For example, in metering a liquid having a surface tension approximating that of the common household detergent from an eight ounce bottle through a tube having a passageway diameter of 0.093 inch, from 2½ cc. to 3 cc. of liquid will pass through the passageway as the bottle is emptied of its contents if the bottle is held inverted for abnormally prolonged periods of time.

With diameters less than 0.093 inch or with products having a higher surface tension, the theoretical amount of liquid that can pass through the tube will be even less. However, this amount is theoretical. Under usual conditions where the bottle of the foregoing example is simply tipped for dispensing and then returned promptly to its upright position, only 2 cc. to 2½ cc. of liquid will pass through the tube during the dumping action as the bottle contents are used up.

Moreover, this predictable amount of liquid will pass through the tube into the chamber immediately upon inversion of the bottle and can therefore go toward making up the desired dosage. Thus, if the desired dosage is 6 cc., the closure chamber can be dimensioned so that ⅔ or 4 cc. of the dosage remains in the chamber after loading. The remaining ⅓ or 2 cc. of the dosage will pass from the bottle to complete the dosage at the moment of inverting for dispensing of the product.

Where the dosage to be dispensed with each use is sufficiently large, e.g., 12 cc. or more in the foregoing example, the total amount of liquid which passes from the bottle during the dumping action will be within the 20% tolerance accepted for drug product doses. In such cases, the chamber of the closure can be dimensioned so that the amount of liquid remaining therein after loading and prior to dumping will be equal to the desired dosage with the liquid escaping the bottle during dumping constituting insignificant overage.

In such applications, the embodiment illustrated in FIGURES 5–10 of the drawing can be employed. The increase in diameter of the passageway from constriction 26a to terminus portion 27 results in a breaking up of the overage stream into droplets. This reduces the rate of overage egress and thus reduces the actual quantity of overage occurring in normal operation. By way of illustration, with a small diameter size of 0.093 inch and a terminus passageway size of 0.160 inch when used with the typical drug preparation referred to above, the overage occurring during normal dispensing of the liquid from the metering chamber is reduced to approximately ¼ cc.—well within accepted limits.

As the bottle contents are exhausted with continued use, it is evident that the liquid level in the bottle will at some point pass the bottom wall of the closure when the bottle is inverted and the remaining liquid would be unable to enter the tube passageway. Therefore, the provision of a lateral passageway such as the passageway 28 illustrated in connection with the embodiment of FIGURES 6–10 permits the remaining liquid to enter the tube passageway through side wall 22a of the closure whereupon all of the contents of the bottle may be exhausted before it need be refilled.

The invention in its broader aspects is not limited to the specific elements, steps, methods, compositions, combinations and arrangements shown and described, but departure may be made therefrom within the scope of the accompanying claims without departing from the principles of the invention and without sacrificing its chief advantages.

What is claimed is:

1. A device for metering and dispensing pre-selected volumes of liquid from a squeeze bottle having a neck defining a mouth comprising a closure body adapted for mounting on said neck in sealing engagement therewith and extending downwardly within said mouth, said closure body defining a metering chamber therein having an open top, and cover means adapted to cooperate with said neck, to seal off the open top of said chamber said closure body having a tube extending upwardly from the bottom thereof with a terminus located within said chamber, the bore of said tube passing through the bottom of said closure body to define a passageway between the interior of said bottle and the interior or metering chamber of said closure body so that when said bottle is inverted and squeezed with said cover means in place, liquid passes through said tube to displace the air in said chamber until the liquid in said chamber reaches the terminus of said tube, at least a segment of said tube bore being of a diameter small enough to prevent the passage of air therethrough towards said bottle when filled with liquid so that when said bottle is inverted for dispensing the liquid in said chamber, a vacuum condition is set up in said bottle to support the liquid remaining therein when a predictable volume of liquid has departed therefrom into said tube whereby liquid can be dispensed from said bottle in accurately metered volumes without removal of said closure body.

2. A metering device as defined in claim 1, including means for retarding the outflow of overage from said tube when said bottle is inverted for dispensing the liquid in said chamber.

3. A metering device as defined in claim 1, wherein said small diameter is in the range of 0.04 to 0.093 inch.

4. A metering device as defined in claim 1, wherein the terminus of said tube is volumetrically centrally located in said chamber.

5. A device as defined in claim 1, wherein said closure body has lateral conduit means leading from the bottle interior adjacent the neck thereof and communicating with said tube passageway for passing liquid from within said bottle near said neck to said passageway and thence to said metering chamber when said bottle is inverted and squeezed.

6. Apparatus for dispensing liquid in pre-selected metered volumes comprising, in combination (a) a squeeze type container having a neck defining a mouth (b) a closure body having a bottom wall and a side wall to define a metering chamber therein with an open top, said closure body being mounted on said neck with its side wall in sealing engagement therewith and extending downwardly within said mouth to seal off the interior of said container and (c) a cover cap removably secured to said neck for sealing off said metering chamber said closure body having an upstanding tube integrally formed with its bottom wall and extending upwardly therefrom with its terminus located within said chamber, the bore of said tube extending through the bottom wall of said closure body to define a passageway between the interior of said container and the metering chamber of said closure, at least a portion of said passageway having a small diameter in the range of 0.04 to 0.093 inch to prevent the passage of air towards said bottle interior when said tube is filled with liquid whereby liquid can be dispensed in pre-selected metered volumes while said closure body remains attached to said container.

7. Apparatus as defined in claim 6, including means for retarding the outflow of overage from said tube when said container is inverted for dispensing the liquid in said chamber.

8. Apparatus as defined in claim 7, wherein said retard means includes a double diameter tube passageway, the portion of said passageway having the smaller of said two diameters being displaced from the terminus of said tube.

9. Apparatus as defined in claim 8, wherein said tube terminus is volumetrically centrally located in said chamber.

References Cited
UNITED STATES PATENTS

| | | | |
|---|---|---|---|
| 2,714,975 | 8/1955 | Greene | 222—207 X |
| 2,720,343 | 10/1955 | Ross et al. | 222—420 X |
| 3,033,420 | 5/1962 | Thomas et al. | 222—456 X |
| 3,175,736 | 3/1965 | Pelto | 222—207 |

STANLEY H. TOLLBERG, *Primary Examiner.*